March 29, 1955  E. W. LAMKIN  2,704,909
ARTIFICIAL BIRDS
Filed May 20, 1954

Inventor
Everett W. Lamkin
by Roberts, Cushman & Grover
Att'ys

United States Patent Office 2,704,909
Patented Mar. 29, 1955

2,704,909

ARTIFICIAL BIRDS

Everett W. Lamkin, Lynn, Mass.

Application May 20, 1954, Serial No. 431,099

7 Claims. (Cl. 46—53)

This invention relates to artificial birds of the type which are pivotally mounted on a post or other support to face the wind and which have wings pivoted to flutter like birds of the hummingbird type.

Objects of the invention are to provide an artificial bird which is simple and economical in construction, which is durable and reliable in use, and in which the movement of the wings closely simulates that of birds of the hummingbird type.

According to the present invention the device comprises a body, wings on opposite sides of the body, means flexibly interconnecting the wings so that they can flutter up and down, the aforesaid means comprising a spring, bearings for the interconnecting means which permit the means to slide in the bearings lengthwise of the wings, and stops for limiting the endwise sliding. In the preferred embodiment the pivot means includes shafts extending from the wings into the body and shaft bearings mounted on opposite sides of the body respectively to permit the wings to flap up and down and also tilt back and forth, and a coil spring interconnecting the opposed ends of the shafts. In one aspect the invention involves a guide for the spring which permits it to flex up and down but restricts its back and forth flexing. In another aspect the bearings have openings to receive the shafts and the openings are elongate vertically to permit the shafts to swing vertically while restricting back and forth swinging. In another aspect the shafts, or other interconnecting means joins the wings in front of their longitudinal center lines so that the wind causes them to tilt back and forth without turning over. In still another aspect arms extend from the shafts lengthwise of the body between the aforesaid bearings and weights are adjustably mounted on the arms. In a more specific aspect the shafts have stops to restrict endwise movement of the shafts in the aforesaid openings.

Figure 1:
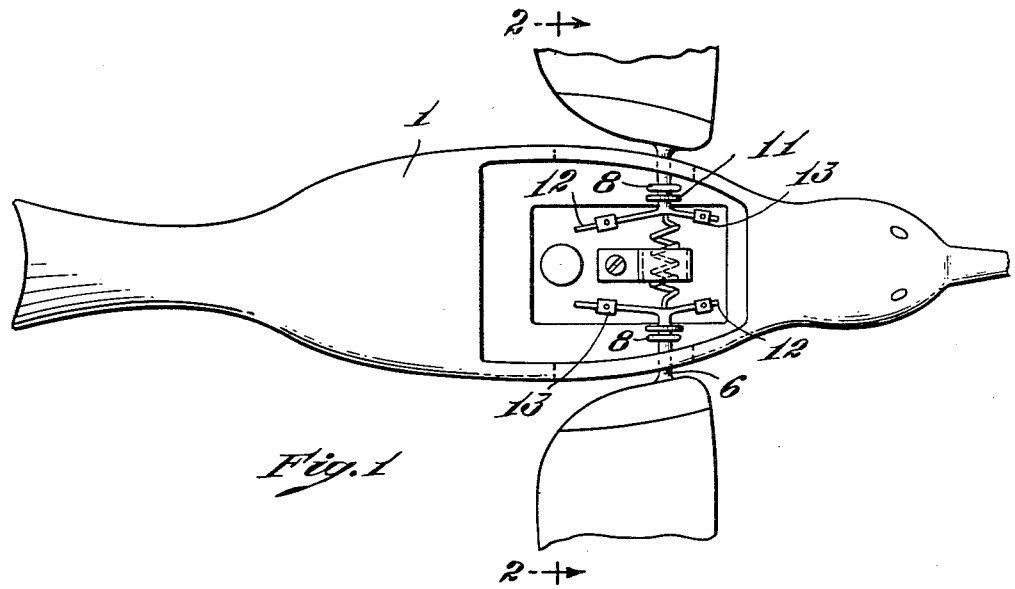
Figure 2:
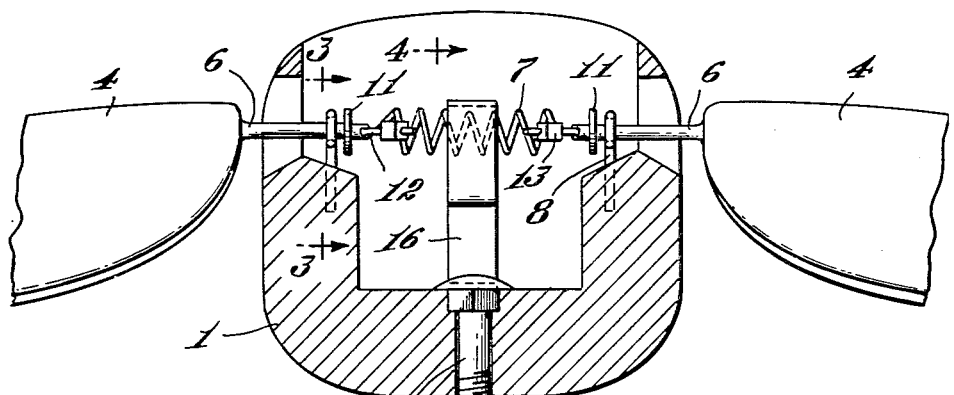
Figure 4:
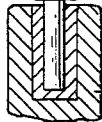
Figure 3:
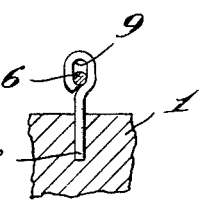

For the purpose of illustration a typical embodiment of the invention is shown in the accompanying drawings in which Fig. 1 is a plan view;
Fig. 2 is a section on line 2—2 of Fig. 1;
Fig. 3 is a section on line 3—3 of Fig. 2; and
Fig. 4 is a section on line 4—4 of Fig. 2.

The particular embodiment of the invention chosen for the purpose of illustration comprises a body 1 pivoted on a support 2 by means of a pin 3 so that the body always faces into the wind, and wings 4 which are flexibly interconnected together by means of shafts 6 and a coil spring 7. The interconnecting means is pivotally supported on the body by means of posts 8 having openings 9 which are elongate vertically to permit the shafts to swing vertically while restricting back and forth swinging. Stops 11 fast to the shafts 6 limit the endwise movement of the shafts in the bearings. Extending fore and aft from the inner ends of the shafts are arms 12 carrying adjustable weights 13 to balance the weight of the wings so that the idle position of the wings can be adjusted. Normally the weights are so adjusted that the wings normally extend approximately horizontally or droop somewhat with their rear edges somewhat lower than their forward edges.

Mounted on the bottom of the hollow body by means of a screw 14 is a guide 16 for the spring 7, the guide having an opening which is elongate vertically so that it can flex freely up and down but is restricted in its back and forth flexing.

As shown in Fig. 1 the shafts 6 join the wings well in front of their longitudinal center lines so that the wind causes them to tilt back and forth without turning over.

By virtue of the aforesaid construction the wings can flutter up and down and tip back and forth in response to the wind, thereby simulating a hummingbird in flight.

I claim:

1. An artificial bird comprising a body, wings and means for pivotally supporting the wings on the body, said means including shafts extending from the wings into the body, bearings for the shafts mounted on opposite sides of the body respectively to permit the wings to flap up and down and also tilt back and forth, a coil spring interconnecting the opposed ends of the shafts, and a guide for the spring which permits it to flex up and down but restricts its back and forth flexing.

2. An artificial bird comprising a body, wings and means for pivotally supporting the wings on the body, said means including shafts extending from the wings into the body, bearings for the shafts mounted on opposite sides of the body respectively to permit the wings to flap up and down and also tilt back and forth, said bearings having openings to receive the shafts, the openings being elongate vertically to permit the shafts to swing vertically while restricting back and forth swinging, and a coil spring interconnecting the opposed ends of the shafts.

3. An artificial bird comprising a body, wings and means for pivotally supporting the wings on the body, said means including shafts extending from the wings into the body, bearings for the shafts mounted on opposite sides of the body respectively to permit the wings to flap up and down and also tilt back and forth, a coil spring interconnecting the opposed ends of the shafts, arms extending from said shafts lengthwise of the body between said bearings, and weights adjustably mounted on said arms.

4. An artificial bird comprising a body, wings and means for pivotally supporting the wings on the body, said means including shafts extending from the wings into the body, bearings for the shafts mounted on opposite sides of the body respectively to permit the wings to flap up and down and also tilt back and forth, stops on the shafts to restrict endwise movement of the shafts in said openings, a coil spring interconnecting the opposed ends of the shafts, and a guide for the spring which permits it to flex up and down but restricts its back and forth flexing.

5. An artifiical bird comprising a body, wings and means for pivotally supporting the wings on the body, said means including shafts extending from the wings into the body, bearings for the shafts mounted on opposite sides of the body respectively to permit the wings to flap up and down and also tilt back and forth, stops on the shafts to restrict endwise movement of the shafts in said openings, a coil spring interconnecting the opposed ends of the shafts, arms extending from said shafts lengthwise of the body between said bearings, and weights adjustably mounted on said arms.

6. An artificial bird comprising a body, wings and means for pivotally supporting the wings on the body, said means including shafts extending from the wings into the body, bearings for the shafts mounted on opposite sides of the body respectively to permit the wings to flap up and down and also tilt back and forth, said bearings having openings to receive the shafts, the openings being elongate vertically to permit the shafts to swing vertically while restricting back and forth swinging, a coil spring interconnecting the opposed ends of the shafts, a guide for the spring which permits it to flex up and down but restricts its back and forth flexing, stops on the shafts to restrict endwise movement of the shafts in said openings, arms extending from said shafts lengthwise of the body between said bearings, and weights adjustably mounted on said arms.

7. An artificial bird comprising a body, wings and means for pivotally supporting the wings on the body, said means including shafts extending from the wings into the body, bearings for the shafts mounted on opposite sides of the body respectively to permit the wings to flap up and down and also tilt back and forth, a coil spring interconnecting the opposed ends of the shafts, arms extending from said shafts lengthwise of the body between said bearings, and weights adjustably mounted on said arms, said shafts joining the wings in front of their longitudinal center lines so that the wind causes them to tilt back and forth.

References Cited in the file of this patent

UNITED STATES PATENTS

| | | |
|---|---|---|
| 1,814,314 | Kane et al. | July 14, 1931 |

FOREIGN PATENTS

| | | |
|---|---|---|
| 451,506 | France | Apr. 21, 1913 |